(12) United States Patent
Ho

(10) Patent No.: US 10,099,732 B2
(45) Date of Patent: Oct. 16, 2018

(54) MOTORIZED WHEELBARROW ASSEMBLY

(71) Applicant: Pha Ho, Guelph (CA)

(72) Inventor: Pha Ho, Guelph (CA)

(*) Notice: Subject to any disclaimer, the term of this patent is extended or adjusted under 35 U.S.C. 154(b) by 114 days.

(21) Appl. No.: 15/162,100

(22) Filed: May 23, 2016

(65) Prior Publication Data

US 2017/0334494 A1  Nov. 23, 2017

(51) Int. Cl.
*B62D 51/04* (2006.01)
*B62B 5/00* (2006.01)

(52) U.S. Cl.
CPC ............ *B62D 51/04* (2013.01); *B62B 5/0026* (2013.01)

(58) Field of Classification Search
CPC ............................ B62D 51/04; B62B 5/0026
USPC ................... 180/19.3, 19.1; 298/2, 3
See application file for complete search history.

(56) References Cited

U.S. PATENT DOCUMENTS

| | | | |
|---|---|---|---|
| 2,918,133 A * | 12/1959 | Ericsson | B62B 1/24 180/19.1 |
| 3,791,470 A | 2/1974 | Baddore et al. | |
| 4,356,875 A * | 11/1982 | Clune | B62B 3/12 180/13 |
| 5,211,254 A | 5/1993 | Harris, III et al. | |
| 5,465,801 A | 11/1995 | Hoover | |
| 5,489,000 A * | 2/1996 | Hillbohm | B62B 1/002 180/19.1 |
| D465,631 S | 11/2002 | Brant | |
| 2002/0084119 A1 | 7/2002 | Brabetz | |
| 2003/0178801 A1* | 9/2003 | Hart | B62B 1/18 280/47.371 |
| 2007/0079999 A1* | 4/2007 | Lamanna | B62D 51/04 180/19.1 |
| 2007/0089917 A1 | 4/2007 | Hartley | |

FOREIGN PATENT DOCUMENTS

WO  WO2004113148  12/2004

* cited by examiner

Primary Examiner — Tony H Winner

(57) ABSTRACT

A motorized wheelbarrow assembly for includes a wheelbarrow that has a pair of handles and a wheel rotatably coupled between the pair of handles. The wheel may roll along a support surface. A drive unit is coupled to the wheelbarrow. The drive unit is in mechanical communication with the wheel. The drive unit selectively rotates the wheel to urge the wheelbarrow along the support surface.

6 Claims, 5 Drawing Sheets

MOTORIZED WHEELBARROW ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING ASSEMBLY

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98.

The disclosure and prior art relates to wheelbarrow devices and more particularly pertains to a new wheelbarrow device having a motorized drive.

BRIEF SUMMARY OF THE INVENTION

An embodiment of the disclosure meets the needs presented above by generally comprising a wheelbarrow that has a pair of handles and a wheel rotatably coupled between the pair of handles. The wheel may roll along a support surface. A drive unit is coupled to the wheelbarrow. The drive unit is in mechanical communication with the wheel. The drive unit selectively rotates the wheel to urge the wheelbarrow along the support surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
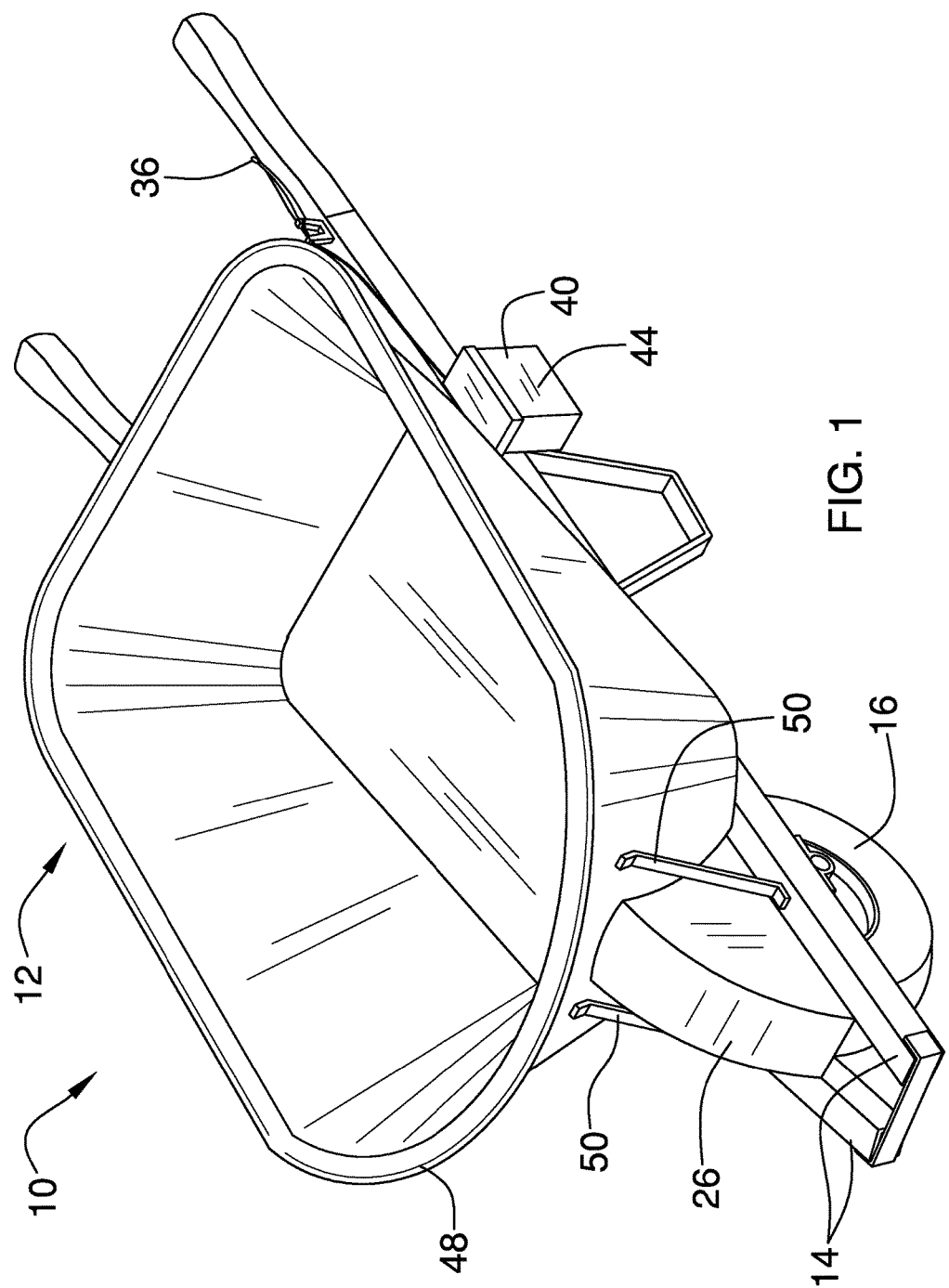
FIG. 1 is a top perspective view of a motorized wheelbarrow assembly according to an embodiment of the disclosure.
Figure 2:
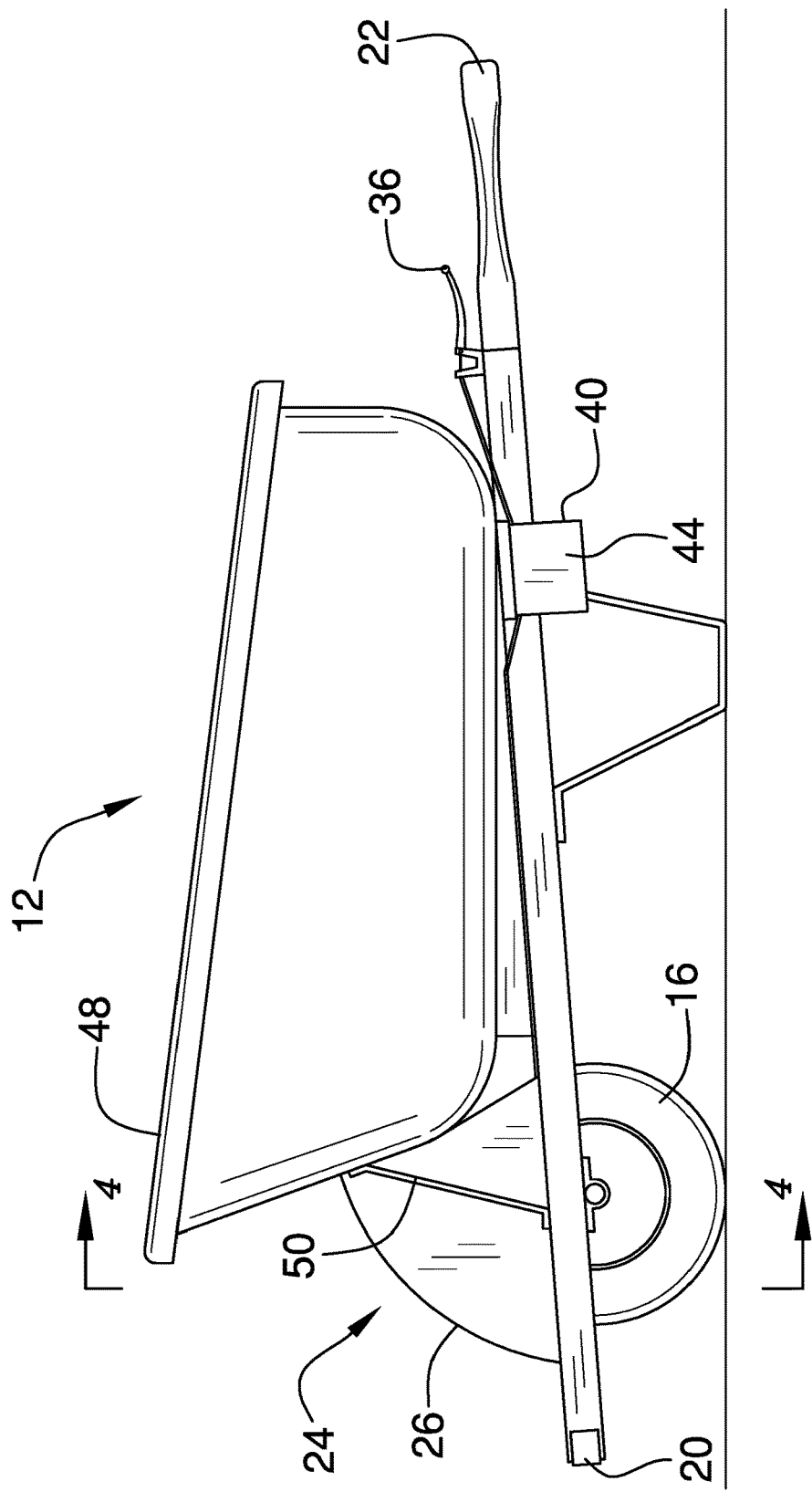
FIG. 2 is a left side view of an embodiment of the disclosure.
Figure 3:
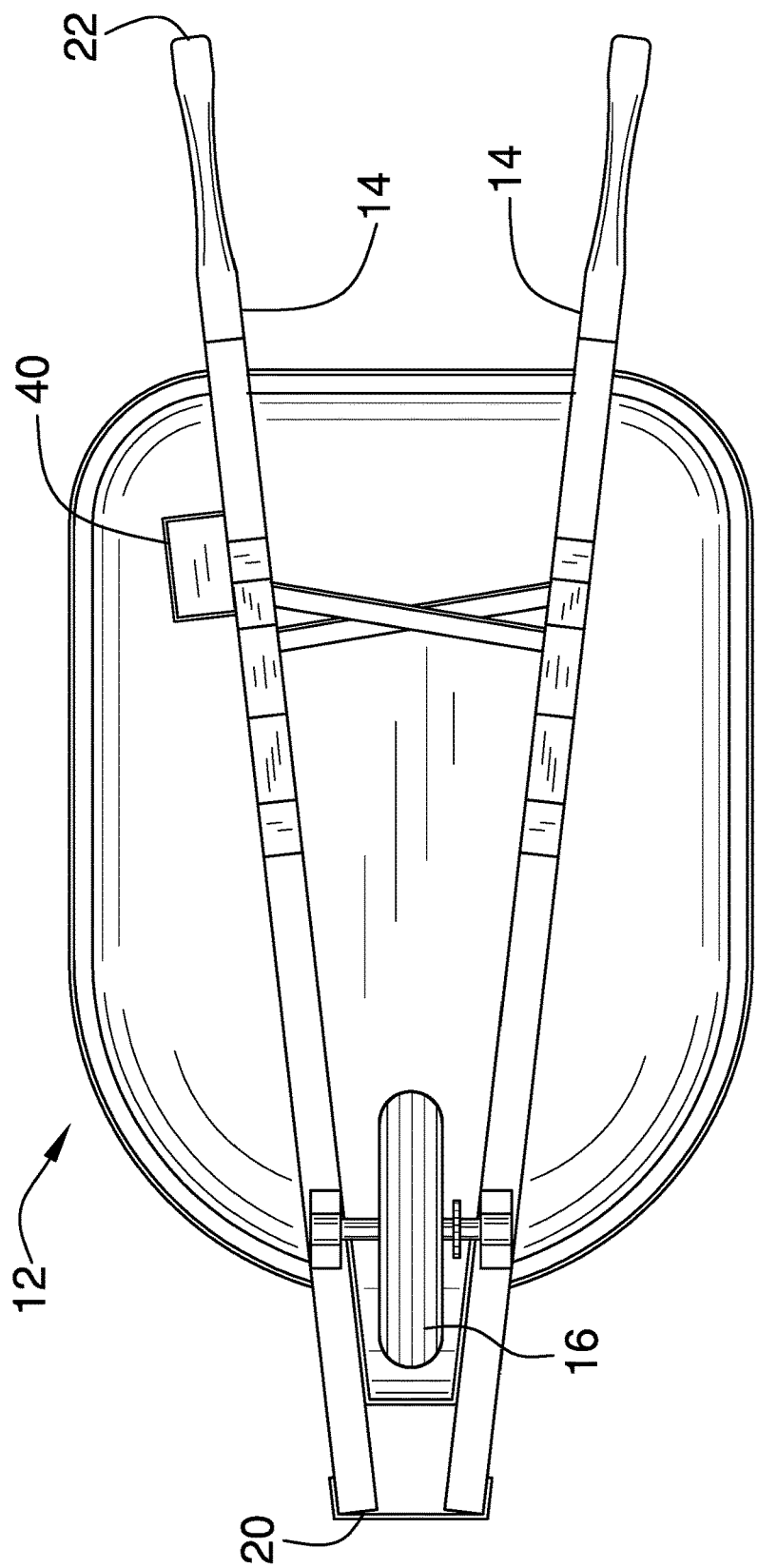
FIG. 3 is a bottom view of an embodiment of the disclosure.
Figure 4:
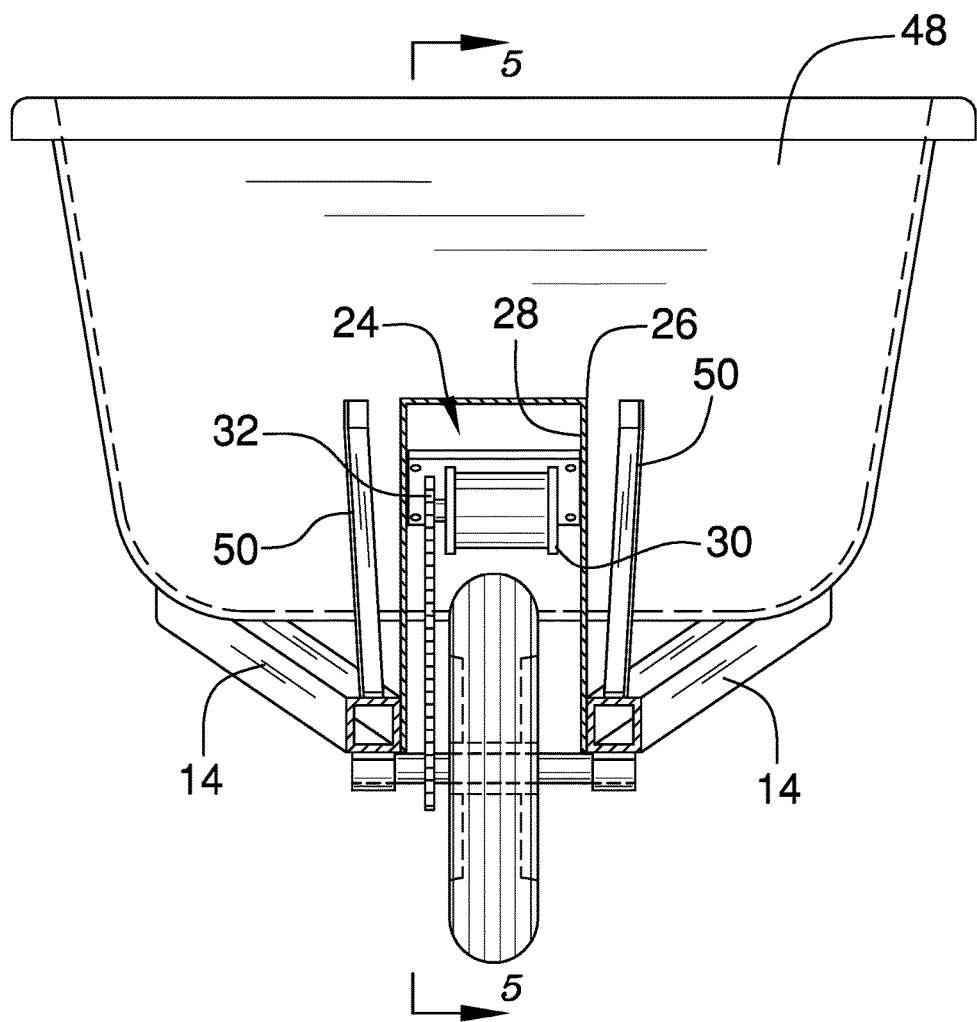
FIG. 4 is a front view of an embodiment of the disclosure.
Figure 5:
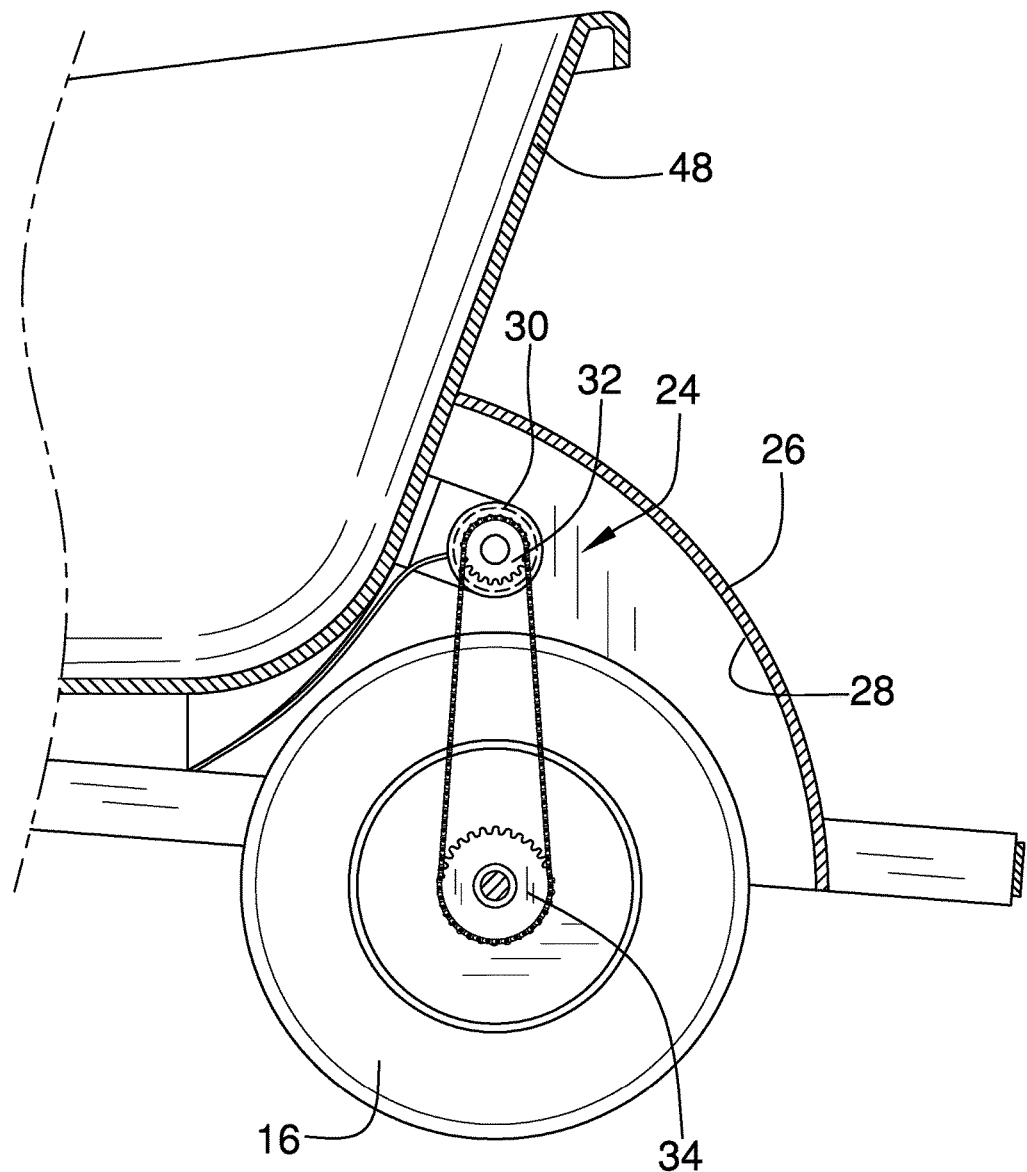
FIG. 5 is a cross sectional view taken along line 5-5 of FIG. 4 of an embodiment of the disclosure.

With reference now to the drawings, and in particular to FIGS. 1 through 5 thereof, a new wheelbarrow device embodying the principles and concepts of an embodiment of the disclosure and generally designated by the reference numeral 10 will be described.

As best illustrated in FIGS. 1 through 5, the motorized wheelbarrow assembly 10 generally comprises a wheelbarrow 12. The wheelbarrow 12 has a pair of handles 14 and a wheel 16 that is rotatably coupled between the pair of handles 14. Thus, the wheel 16 may roll along a support surface 18. Each of the handles 14 has a front end 20 and a back end 22. The wheel 16 is positioned closer to the front end 20 than the back end 22. The support surface 18 may be ground and wheelbarrow 12 may be a wheelbarrow of any conventional design.

A drive unit 24 is provided. The drive unit 24 is coupled to the wheelbarrow 12 and the drive unit 24 is in mechanical communication with the wheel 16. The drive unit 24 selectively rotates the wheel 16. Thus, the drive unit 24 may urge the wheelbarrow 12 along the support surface 18.

The drive unit 24 comprises a fender 26 that is coupled between the pair of handles 14. The fender 26 is positioned to cover the wheel 16 and the fender 26 has an inner surface 28. A motor 30 is coupled to the fender 26 such that the motor 30 is aligned with the wheel 16. The motor 30 is positioned on the inner surface 28 of the fender 26. The motor 30 may comprise an electrical motor or the like. Moreover, the motor 30 may have a maximum rotational speed of approximately 1000 rpm.

A first gear 32 is coupled to the motor 30 and the motor 30 rotates the first gear 32 when the motor 30 is turned on. A second gear 34 is coupled to the wheel 16. A chain 36 extends between the first gear 32 and the second gear 34. Thus, motor 30 rotates the wheel 16 when the motor 30 is turned on. The first gear 32 and the second gear 34 may have a gear ratio ranging between approximately 8.0:1 and 10.0:1. Thus, the wheelbarrow 12 may travel at a speed that enhances a user's ability to control the wheelbarrow 12.

A lever 36 is movably coupled to an associated one of the handles 14 and the lever 36 may be manipulated. The lever 36 is electrically coupled to the motor 30. The lever 36 turns the motor 30 on when the lever 36 is manipulated. Thus, the wheelbarrow 12 may transport a load along the support surface 18.

A power supply 40 is coupled to the wheelbarrow 12. The power supply 40 is electrically coupled to the lever 36 and the power supply 40 comprises at least one battery 42. A battery box 44 may be coupled to an associated one of the handles 14. The at least one battery 42 may be positioned within the battery box 44.

The wheelbarrow 12 includes a bucket 48 and a pair of braces 50. Each of the braces 50 is coupled between the bucket 48 and an associated one of the handles 14. Moreover, each of the braces 50 is positioned on opposite sides of the fender 26. Each of the braces 50 inhibits the handles 14 from being urged laterally with respect to the bucket 48.

In use, the back end 22 of each of the handles 14 is gripped. Each of the handles 14 is urged upwardly to lift a stand 46 of the wheelbarrow 12 upwardly from the support surface 18. The lever 36 is manipulated and the motor 30 rotates the wheel 16. Thus, the wheelbarrow 12 transports a load along the support surface 18. The lever 36 is released to stop the wheelbarrow 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A motorized wheelbarrow assembly comprising:
    a wheelbarrow having a pair of handles and a single wheel rotatably coupled between the pair of handles wherein said single wheel is configured to roll along a support surface when said wheelbarrow is lifted by said pair of handles; and
    a drive unit being coupled to said wheelbarrow, said drive unit being in mechanical communication with said single wheel, said drive unit selectively rotating said single wheel wherein said drive unit is configured to urge said wheelbarrow along the support surface, said drive unit including a motor, a first gear coupled to said motor, a second gear coupled to said single wheel, and a chain operatively coupling said first gear to said second gear wherein said motor rotates said single wheel, said first gear being vertically positioned above said second gear wherein said chain is vertically oriented extending between said first gear and said second gear.

2. The assembly according to claim 1, wherein said drive unit comprises a fender being coupled between said pair of handles, said fender being positioned to cover said wheel, said fender having an inner surface.

3. The assembly according to claim 2, further comprising said motor being coupled to said fender such that said motor is vertically aligned over said single wheel, said motor being positioned on said inner surface of said fender.

4. The assembly according to claim 1, wherein said drive unit comprises
    a lever being movably coupled to an associated one of said handles wherein said lever is configured to be manipulated, said lever being electrically coupled to said motor such that said lever turns said motor on when said lever is manipulated wherein said wheelbarrow is configured to transport a load along the support surface.

5. The assembly according to claim 4, further comprising a power supply being coupled to said wheelbarrow, said power supply being electrically coupled to said lever, said power supply comprising at least one battery.

6. A motorized wheelbarrow assembly comprising:
    a wheelbarrow having a pair of handles and a single wheel rotatably coupled between the pair of handles wherein said single wheel is configured to roll along a support surface when said wheelbarrow is lifted by said pair of handles, each of said handles having a front end and a back end, said single wheel being positioned closer to said front end than said back end; and
    a drive unit being coupled to said wheelbarrow, said drive unit being in mechanical communication with said single wheel, said drive unit selectively rotating said single wheel wherein said drive unit is configured to urge said wheelbarrow along the support surface, said drive unit comprising:
        a fender being coupled between said pair of handles, said fender being positioned to cover said single wheel, said fender having an inner surface,
        a motor being coupled to said fender such that said motor is vertically aligned over said single wheel, said motor being positioned on said inner surface of said fender,
        a first gear being coupled to said motor such that said motor rotates said first gear when said motor is turned on,
        a second gear being coupled to said single wheel,
        a chain extending between said first gear and said second gear such that said motor rotates said single wheel when said motor is turned on, said first gear being vertically positioned above said second gear wherein said chain is vertically oriented extending between said first gear and said second gear,
        a lever being movably coupled to an associated one of said handles wherein said lever is configured to be manipulated, said lever being electrically coupled to said motor such that said lever turns said motor on when said lever is manipulated wherein said wheelbarrow is configured to transport a load along the support surface, and
        a power supply being coupled to said wheelbarrow, said power supply being electrically coupled to said lever, said power supply comprising at least one battery.

* * * * *